(12) United States Patent
Bouteille et al.

(10) Patent No.: US 10,712,313 B2
(45) Date of Patent: Jul. 14, 2020

(54) FEEDBACK METHOD AND DEVICE ON HIGH VOLTAGE OF A GAS DETECTOR

(71) Applicant: COMMISSARIAT A L'ENERGIE ATOMIQUE ET AUX ENERGIES ALTERNATIVES, Paris (FR)

(72) Inventors: Simon Bouteille, Limoges (FR); Sebastien Procureur, Palaiseau (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 15/929,038

(22) Filed: Aug. 10, 2018

(65) Prior Publication Data

US 2019/0056354 A1  Feb. 21, 2019

(30) Foreign Application Priority Data

Aug. 18, 2017 (FR) ...................................... 17 57755

(51) Int. Cl.
  *G01T 1/00* (2006.01)
  *G01N 27/66* (2006.01)
  (Continued)

(52) U.S. Cl.
  CPC .............. *G01N 27/66* (2013.01); *G01T 1/00* (2013.01); *G01T 1/185* (2013.01); *G05F 1/46* (2013.01)

(58) Field of Classification Search
  CPC .................................................... G01N 27/66
  See application file for complete search history.

(56) References Cited

U.S. PATENT DOCUMENTS

| 3,487,222 A * | 12/1969 | Martens | ............... | H03G 3/3084 |
|  |  |  |  | 250/207 |
| 3,800,143 A * | 3/1974 | Fishman | .............. | G01N 23/203 |
|  |  |  |  | 250/363.01 |

(Continued)

FOREIGN PATENT DOCUMENTS

| EP | 0 483 007 A2 | 4/1992 |
| JP | 58-187885 | 11/1983 |
| WO | WO 2011/138631 A1 | 11/2011 |

OTHER PUBLICATIONS

French Preliminary Search Report dated Apr. 30, 2018 in French Application 17 57755 filed on Aug. 18, 2017 (with English Translation of Categories of Cited Documents).

(Continued)

*Primary Examiner* — David P Porta
*Assistant Examiner* — Djura Malevic
(74) *Attorney, Agent, or Firm* — Oblon, McClelland, Maier & Neustadt, L.L.P.

(57) ABSTRACT

A feedback device for a gas ionisation particle detector that includes a high voltage generator capable of creating a potential difference between electrodes placed in a gas chamber. The feedback device includes a voltage regulator configured to calculate an indicator characteristic of a measurement signal output by an electronic read unit capable of collecting an electrical signal induced by a particle passing through the chamber and to modify a set voltage output to the high voltage generator as a function of the indicator characteristic of the measurement signal. The characteristic indicator may be an average amplitude. The feedback device can use an error signal corresponding to the difference between the calculated characteristic indicator and a predetermined value.

9 Claims, 1 Drawing Sheet

(51) Int. Cl.
*G01T 1/185* (2006.01)
*G05F 1/46* (2006.01)

(56) References Cited

U.S. PATENT DOCUMENTS

| | | | | |
|---|---|---|---|---|
| 4,272,677 | A * | 6/1981 | Berthold | G01T 1/40 250/252.1 |
| 4,482,808 | A * | 11/1984 | Tominaga | G01T 1/40 250/392 |
| 4,760,252 | A * | 7/1988 | Albats | G01V 5/04 250/266 |
| 4,999,501 | A * | 3/1991 | Lacy | G01T 1/2935 250/374 |
| 5,160,844 | A * | 11/1992 | Albats | G01T 1/40 250/374 |
| 7,304,310 | B1 * | 12/2007 | Shortt | G01N 21/94 250/372 |
| 8,569,683 | B2 * | 10/2013 | Freiburger | G01T 1/40 250/252.1 |
| 8,937,275 | B2 * | 1/2015 | Kulik | H03K 21/02 250/214 R |
| 9,535,168 | B2 * | 1/2017 | Desaute | G01T 1/185 |
| 9,797,772 | B2 * | 10/2017 | Fontbonne | G01T 1/248 |
| 10,094,935 | B2 * | 10/2018 | Ota | G01T 1/161 |
| 2008/0210878 | A1 * | 9/2008 | Friedman | G01T 1/18 250/374 |
| 2013/0058458 | A1 * | 3/2013 | Desaute | G01T 1/185 378/62 |

OTHER PUBLICATIONS

A. Curioni, et al., "Measurements of $^{55}$Fe activity in activated steel samples with GEMPix," Nuclear Instruments and Methods in Physics Research A 849, 2017, pp. 60-71.

\* cited by examiner

FEEDBACK METHOD AND DEVICE ON HIGH VOLTAGE OF A GAS DETECTOR

TECHNICAL DOMAIN

The domain of the invention is gas ionisation particle detectors. Such detectors use a gas as interaction medium and high voltages to amplify electrical charges created by incident particles that pass through the detector. The invention relates more particularly to a feedback system of these high voltages to stabilise the amplitude of signals output by such a gas detector.

STATE OF PRIOR ART

As it passes through the chamber of a gas detector, a particle ionises gas atoms by tearing their electrons from them. In the presence of an electric field in the detector applied between at least two electrodes placed in the chamber, for example an anode and a cathode, electrons tend towards the anode while ions tend towards the cathode.

FIG. 1 shows a diagram of a MICROMEGAS (for MICRO MEsh GAseous Structure) type gas detector. When an incident charged particle (arrow in dashed lines) passes through the gas volume of the detector, it ionises the gas along its trajectory. When an electric field is applied between a deflection electrode 1 and a microgrid 2 (generally with a high voltage V1 on the deflection electrode), the electrons thus created are deflected to this microgrid 2. By applying a second electric field between this microgrid and read tracks 3 (and therefore a second high voltage V2 either on the microgrid or on the tracks, the other electrode usually being connected to the ground potential), the electrons pass through the microgrid and multiply (avalanche phenomenon) this inducing a significant signal on the tracks connected to the read electronics. The average size of the avalanche (in other words the electron multiplication factor, called the detector gain) is closely dependent on the conditions of the gas, particularly its composition (including its moisture content), its temperature and its pressure. It also depends on the field in the amplification space, in other words the applied high voltage V2.

Therefore the average avalanche size, and therefore the amplitude of the resulting signal, depends on many parameters, including environmental (temperature, pressure) and related to the composition of the gas (presence of additives, pollutants, moisture, etc.). Variations of these parameters are frequent and modify the average amplitude of the signals.

In most cases, these variations are not corrected, particularly for indoor uses in which relative variations of the temperature and pressure are limited. However, for some developing applications such as muon imagery (muography), the detectors are frequently used outdoors, as close as possible to the structures to be imaged. In such a case, environmental variations can be very large, and can thus make a large difference to the performances of the detector (stability, efficiency, spatial or time resolution, etc.).

Solutions have been developed that make use of sensors placed in the gas volume so as to measure all or part of the environmental parameters (gas temperature, atmospheric pressure, humidity, etc.), and implement feedback of high voltages by using variations of these parameters to calculate a set value to be input to the high voltage power supply of the detector. An example of a correction of variations in environmental parameters is for example described in the paper "Measurements of $^{55}$Fe activity in activated steel samples with GEMPix», A. Curioni et al., NIM A 849 (2017), 60 (section 7).

Such an adjustment of the high voltage stabilises the amplitude of detectors, but only partially. The relation between the gain of the detector and environmental parameters is complex, and also depends on the gas composition. The same problem also arises when the gas flow is very low, or even zero when then detectors are used in a closed circuit, since the gas composition can change, together with the amplitude.

Thus, the results of these feedback systems are not very satisfactory, and amplitude variations are always observed. This is the framework in which one objective of the invention is to disclose a more efficient feedback system.

PRESENTATION OF THE INVENTION

In particular, the invention discloses a feedback device for a gas ionisation particle detector that comprises a detection chamber containing gas and a high voltage generator capable of creating a potential difference between electrodes. The feedback device comprises a voltage regulator configured to:
  calculate a characteristic indicator of a measurement signal delivered by an electronic read unit capable of collecting an electrical signal induced by a particle passing through the chamber; and
  modify a set voltage output to the high voltage generator depending on the characteristic indicator of the measurement signal.

The feedback device also comprises a noise discrimination unit capable of determining that a measurement signal output by the electronic read unit is not noise, so as to at least partly eliminate noise in the calculation of the characteristic indicator.

Some preferred but non-limitative aspects of this device are as follows:
  the voltage regulator is configured to modify the set voltage so as to minimise the difference between the characteristic indicator of the measurement signal and a predetermined value;
  the characteristic indicator is calculated for a given number of collections of an electrical signal induced by a particle;
  the characteristic indicator of the measurement signal is a characteristic amplitude of the measurement signal, for example an average amplitude;
  the voltage regulator is configured to calculate the characteristic indicator of the measurement signal based on samples of the measurement signal corresponding to a collection by the electronic read unit of an electrical signal determined as not being noise by the noise discrimination unit;
  the noise discrimination unit is configured to reconstruct a particle trajectory and the voltage regulator is configured to calculate the characteristic indicator of the measurement signal based on samples of the measurement signal corresponding to a collection by the electronic read unit of an electrical signal induced along the trajectory of a particle reconstructed by the noise discrimination unit.

BRIEF DESCRIPTION OF THE DRAWINGS

Other aspects, purposes, advantages and characteristics of the invention will become clear after reading the following detailed description of preferred embodiments of the invention, given as non-limitative examples, with reference to the appended drawings among which.

DETAILED PRESENTATION OF PARTICULAR EMBODIMENTS

Figure 1:
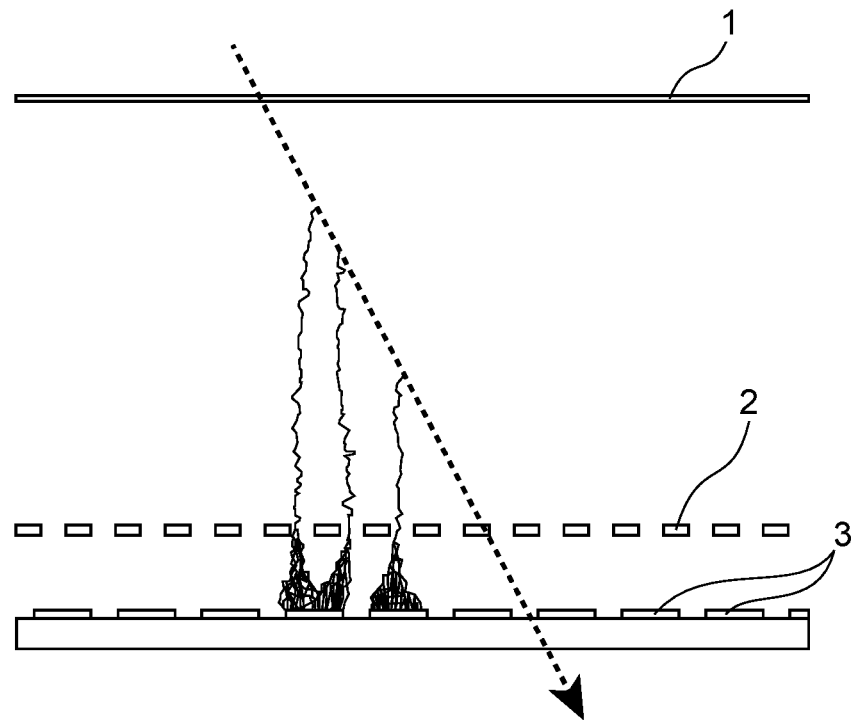
FIG. 1, already discussed above, is a schematic of a MICROMEGAS type detector.

The invention applies to a feedback method and device for a gas ionisation particle detector. The invention is not limited to a MICROMEGAS type detector as illustrated in FIG. 1 but extends to any type of gas detector, for example such as a GEM (Gas Electron Multiplier) detector, a deflection chamber or a Time Projection Chamber (TPC).

Figure 2:
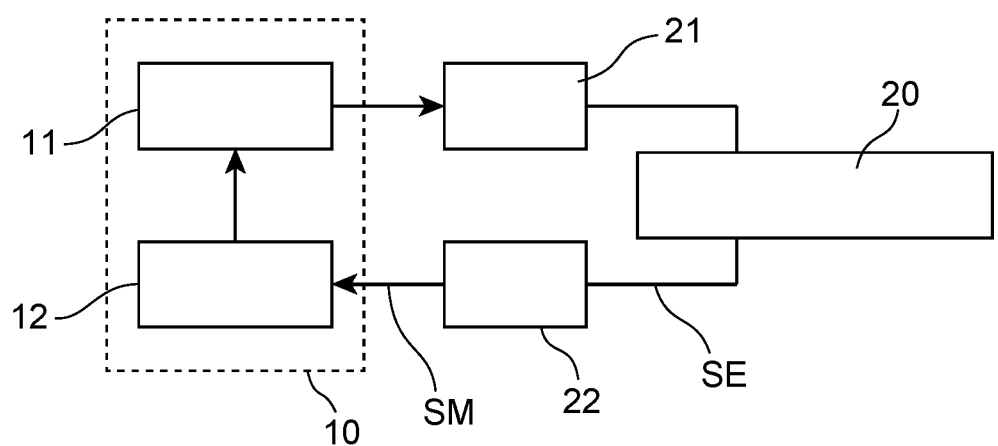
FIG. 2 is a diagram of a gas ionisation detector provided with a feedback device according to the invention.

With reference to FIG. 2, the gas ionisation particle detector comprises a gas chamber 20 (i.e. a detection chamber containing the gas) in which electrodes are placed and a high voltage generator 21 capable of creating a potential difference between the electrodes. The expression "electrodes placed in the chamber refers to electrodes independent of the chamber and also electrodes at least partly formed by the chamber, particularly by its walls.

The detector also comprises read electronics 22 capable of collecting an electrical signal SE (charge or current) induced by a particle in the chamber to supply a measurement signal SM.

The read electronics 22 can sample the electrical signal SE and thus output as measurement signal SM a signal, representative of the shape of the electrical signal induced by a particle. Alternatively, the read electronics can directly integrate the induced electrical signal SE and output as its measurement signal a signal directly representative of the amplitude of the electrical signal induced by each particle in the chamber, if applicable with an associated magnitude (for example the time above a threshold).

The feedback device 10 comprises a voltage regulator 11 configured to calculate a characteristic indicator of the measurement signal SM output by the electronic read unit 22 and to modify a set voltage output to the high voltage generator 21 as a function of the characteristic indicator of the measurement signal.

Starting from the measurement signal SM, the voltage regulator 11 can determine (if applicable) and store at least one magnitude representative of the amplitude of the electrical signal induced by each particle. The voltage regulator 11 thus accumulates several magnitudes representative of the amplitudes corresponding to a succession of incident particles passing through the chamber of the gas detector 20. This accumulation is made over a sufficiently long time (for example a few minutes) to obtain a good estimate of the characteristic indicator, and sufficiently short compared with the variations to be corrected. In practice, this accumulation can be made for a given number of collections of an electrical signal induced by a particle. For example, the accumulation of signals induced by a few hundred particles may be enough to obtain sufficient precision. Alternatively, signals induced by particles are accumulated over a time window.

Feedback according to the invention uses an indicator characteristic of signals induced by particles in the detector, for example a magnitude representative of the amplitudes of these signals. Therefore this feedback is direct, in that it is made on the variable to be adjusted, and not on intermediate parameters that influence this variable. This feedback can thus correct all or some of the parameter variations that have an influence on the gain of the detector. Obviously, this is the case for environmental parameters, but also parameters related to the composition of the gas mix that can change over time (gas leak, degassing of a component, etc.), or different factors modifying the gain (for example the appearance of a leakage current) or a fault in the high voltage supply system (for example when the value of the adjustment high voltage does not correspond to the value actually applied).

The indicator characteristic of the measurement signal can be an amplitude characteristic of the measurement signal, for example an average or median amplitude calculated for a given number of collections of an electrical signal induced by a particle (i.e. based on a given number of detected events) or over a predefined time window.

The indicator characteristic of the measurement signal can be a characteristic time above a threshold, for example an average or median time calculated for a given number of collections of an electrical signal induced by a particle or over a predefined time window.

The indicator characteristic of the measurement signal can be an integral of the measurement signal, for example an average or median integral calculated for a given number of collections of an electrical signal induced by a particle or over a predefined time window.

The indicator characteristic of the measurement signal can be a current induced in the detection chamber, for example an average current integrated over a predefined time window.

The indicator characteristic of the measurement signal can be a number or a fraction of read elements carrying a signal, for example a number or an average or median fraction calculated for a given number of collections of an electrical signal induced by a particle or over a predefined time window.

In particular, the voltage regulator 11 may be configured to modify the set voltage so as to minimise the difference between the characteristic indicator of the measurement signal and a determined value. This predetermined value can be chosen such that the detection efficiency of the detector is the best possible (close to 100% for a charged particle) avoiding excessive saturation of signals. For example, in the case of read electronics that digitizes electrical signals induced by particles, a predetermined value is chosen below a value that would lead to saturation of analog-digital converters installed on the read electronics.

Typically, if the value of the calculated characteristic indicator is less than the predetermined value, the high voltage is increased (in absolute value) and vice versa. The simplest correction consists of modifying the high voltage by a quantity proportional to the difference between the calculated value and the predetermined value. Other non-linear functions and functions using previous values of high voltages, can also be applied so as to better stabilise the amplitude and minimise oscillation phenomena that are classical in feedback.

In one possible embodiment, the feedback device can be configured to select only events that actually correspond to the passage of a particle, by thus eliminating part of the potential noise. To achieve this, the feedback device comprises a noise discrimination unit 12 capable of verifying that the signals output by the electronic read unit actually correspond to a particle and are therefore not noise so that noise signals can be at least partially eliminated from the calculation of the characteristic indicator. Parasite noise (electronic, statistics, etc.) can pass a detection threshold and be incorrectly considered as a physical signal by the feedback device. Therefore using them in the calculation of the characteristic indicator can distort the feedback. Therefore identification of signals actually originating from a particle can give a more robust and more precise feedback. The voltage regulator 11 is thus configured to calculate the indicator characteristic of the measurement signal based on samples of the measurement signal corresponding to the collection by the electronic read unit 20 of an electrical signal determined as not being noise by the unit 12.

The noise discrimination unit 12 may be configured to determine that an electrical signal collected by the electronic unit 20 is not noise and thus enable selection of an event when said event is detected at least a minimum number of times by the different read tracks, or even by different detection chambers that might detect the same particle.

In one variant, the noise discrimination unit 12 can be configured to check that recorded signal positions are on one possible trajectory, for example a straight line. To achieve this, the unit 12 uses for example a linear regression, shape recognition or Kalman filter type trajectory reconstruction algorithm. The voltage regulator 11 then calculates the indicator characteristic of the measurement signal based on samples of the measurement signal corresponding to the collection by the electronic read unit 20 of an electrical signal induced along the trajectory of a particle reconstructed by the noise discrimination unit 12. In such a variant, the feedback device can be coupled to a plurality of detection chambers that can detect the same particle. Each detection chamber can measure the position of the particle, and it is therefore possible to use several chambers to check that the positions of recorded signals are on a possible trajectory.

The feedback device may be implemented by hardware and/or software. It can be onboard an electronic card, that can also house the read electronics.

The invention also applies to a gas detector, for example a muon imager, that includes the feedback device 10 described above. It also includes a method of controlling a gas ionisation particle detector that comprises a high voltage generator 21 capable of creating a potential difference between electrodes placed in a gas chamber 20, characterised in that it includes steps to:

calculate a characteristic indicator of a measurement signal output by an electronic read unit 22 capable of collecting an electrical signal induced by a particle passing through the chamber; and modify a set voltage output to the high voltage generator 21 as a function of the characteristic indicator of the measurement signal.

And the invention also relates to a computer program including code instructions for performing this control method, when said program is executed on a computer.

The invention claimed is:

1. A feedback device for a gas ionisation particle detector that comprises a detection chamber containing gas, electrodes and a high voltage generator configured to create a potential difference between the electrodes, said device comprising a voltage regulator configured to:

calculate a characteristic indicator of a measurement signal output by an electronic read unit configured to collect an electrical signal induced by a particle passing through the chamber; and modify a set voltage output to the high voltage generator as a function of the calculated characteristic indicator;

wherein said device further comprises a noise discrimination unit configured to perform a trajectory reconstruction algorithm to reconstruct a trajectory of the particle passing through the chamber and check whether the electrical signal was induced at positions along the reconstructed particle trajectory, and wherein the voltage regulator is configured to calculate the characteristic indicator of the measurement signal corresponding to a collection by the electronic read unit of the electrical signal checked to have been induced at positions along the reconstructed particle trajectory.

2. A device according to claim 1, in which the voltage regulator is configured to modify the set voltage so as to minimise the difference between the calculated characteristic indicator and a predetermined value.

3. The device according to claim 1, in which the characteristic indicator is calculated for a given number of collections of the electrical signal induced by a particle.

4. The device according to claim 1, in which the characteristic indicator of the measurement signal is a characteristic amplitude of the measurement signal.

5. The device according to claim 4, in which the characteristic amplitude is an average amplitude.

6. A gas ionisation particle detector comprising a detection chamber containing gas, electrodes, a high voltage generator configured to create a potential difference between the electrodes, an electronic read unit configured to collect electrical signals induced by particles in the chamber to output a measurement signal and a feedback device according to claim 1.

7. The device according to claim 1, wherein the trajectory reconstruction algorithm is a Kalman filter trajectory reconstruction algorithm, and wherein the noise discrimination unit is configured to perform the Kalman filter trajectory reconstruction algorithm to reconstruct the trajectory of the particle passing through the chamber and checks whether the electrical signal was induced at positions along the reconstructed particle trajectory.

8. A control method for a gas ionisation particle detector that comprises a detection chamber containing gas, electrodes and a high voltage generator configured to create a potential difference between the electrodes, comprising the steps of:

calculating a characteristic indicator of a measurement signal output by an electronic read unit configured to collect an electrical signal induced by a particle passing through the chamber; and modifying a set voltage output to the high voltage generator as a function of the calculated characteristic indicator;

wherein the method further comprises a step of performing a trajectory reconstruction algorithm to reconstruct a trajectory of the particle passing through the chamber and checking whether the electrical signal was induced at positions along the reconstructed particle trajectory, and wherein the calculating the characteristic indicator of the measurement signal to is based on a collection by the electronic read unit of the electrical signal checked to have been induced at positions along the reconstructed particle trajectory.

9. A non-transitory computer-readable medium including computer executable instructions, wherein the instructions, when executed by a computer, cause the computer to perform a method of processing an image, comprising:

calculating a characteristic indicator of a measurement signal output by an electronic read unit configured to collect an electrical signal induced by a particle passing through a detection chamber; and modifying a set voltage output to a high voltage generator as a function of the calculated characteristic indicator;

performing a trajectory reconstruction algorithm to reconstruct a trajectory of the particle passing through the chamber and checking whether the electrical signal was induced at positions along the reconstructed particle trajectory; and wherein the calculating the characteristic indicator of the measurement signal to is based on a collection by the electronic read unit of the electrical signal checked to have been induced at positions along the reconstructed particle trajectory.

* * * * *